United States Patent
Swaminathan et al.

(10) Patent No.: US 9,626,066 B2
(45) Date of Patent: Apr. 18, 2017

(54) VIDEO PLAYBACK ANALYTICS COLLECTION

(71) Applicant: Adobe Systems Incorporated, San Jose, CA (US)

(72) Inventors: Viswanathan Swaminathan, Saratoga, CA (US); Herman S. Sahota, San Jose, CA (US)

(73) Assignee: Adobe Systems Incorporated, San Jose, CA (US)

( * ) Notice: Subject to any disclaimer, the term of this patent is extended or adjusted under 35 U.S.C. 154(b) by 147 days.

(21) Appl. No.: 13/681,160

(22) Filed: Nov. 19, 2012

(65) Prior Publication Data

US 2014/0143670 A1 May 22, 2014

(51) Int. Cl.
*H04L 29/08* (2006.01)
*H04L 29/06* (2006.01)
*G06F 3/0481* (2013.01)

(52) U.S. Cl.
CPC ............ *G06F 3/0481* (2013.01); *H04L 65/40* (2013.01); *H04L 65/4084* (2013.01)

(58) Field of Classification Search
None
See application file for complete search history.

(56) References Cited

U.S. PATENT DOCUMENTS

| 6,317,777 | B1 * | 11/2001 | Skarbo et al. | 709/204 |
| 8,577,996 | B2 * | 11/2013 | Hughes | G06F 15/16 709/224 |
| 2005/0216844 | A1 * | 9/2005 | Error et al. | 715/745 |
| 2007/0250618 | A1 * | 10/2007 | Hammond | G06F 17/30 709/224 |
| 2009/0060467 | A1 * | 3/2009 | Grigsby | G06F 17/30761 386/239 |
| 2012/0072488 | A1 * | 3/2012 | Manion et al. | 709/203 |
| 2012/0158527 | A1 * | 6/2012 | Cannelongo et al. | 705/14.73 |
| 2012/0317271 | A1 * | 12/2012 | Funk et al. | 709/224 |

OTHER PUBLICATIONS

RFC1644, "T/TCP—TCP Extentions for Transactions Functional Specification", Jul. 1994, http://tools.ietf.org/html/rfc1644.html, pp. 1-5.*

Cutroni, Justin "Tracking YouTube Videos with Google Analytics", retrieved from <http://cutroni.com/blog/2008/07/29/tracking-youtube-videos-with-google-analytics/> on Nov. 7, 2012, (Jul. 29, 2008), 22 pages.

* cited by examiner

*Primary Examiner* — Jeffrey A Gaffin
*Assistant Examiner* — Nhat-Huy T Nguyen
(74) *Attorney, Agent, or Firm* — Wolfe-SBMC (57) ABSTRACT

In embodiments of video playback analytics collection, an analytics script can be distributed to a client device along with video content that is requested by the client device. The analytics script is implemented to identify a type and/or version of a browser application that supports a video player session to playback the video content for viewing at the client device. The analytics script is also implemented to collect video playback data associated with the video content playback, detect an early end of the video player session before the playback of the video content is completed, and initiate communication of the video playback data to an analytics server. The analytics script can also initiate a timing delay to delay a browser navigation away from the video player session, where the timing delay is effective to allow communication of the video playback data to the analytics server.

20 Claims, 5 Drawing Sheets

VIDEO PLAYBACK ANALYTICS COLLECTION

BACKGROUND

Many types of devices can be used to access and display video content for viewing, such as with computer devices, smart televisions, entertainment devices, and mobile devices, such as tablets and mobile phones. Typically, a user with a device can access any number of Web sites, such as news, sports, advertisement, product manufacturers, and any other sites that include downloadable video content. For example, a user may navigate to a news site and watch a video of a news clip, navigate to a sports site and watch a highlight video, and then visit a car manufacturer and watch a new car video. Any of these video content providers may want to know not only which videos are being requested by viewers, but also how much of a video is being watched. For example, the car manufacturer may want to know whether viewers typically watch the new car video all the way through to the end, or stop watching at some point earlier in the video.

A technique that is utilized to collect video playback data is commonly referred to as "heartbeat" data collection, which is used to collect the video playback data at periodic intervals of time while a video is displayed for viewing through a Web browser application using a flash plug-in, HTML5 video tag, or a standalone video player on a device. The video playback data collection at periodic intervals can be used during a video session to mark the progression of video playback at a device. For example, the collected data may be communicated from a device back to a video content provider every five seconds, or after playback of every twenty-five percent segment of a video. The heartbeat data collection is also used because there is currently not a reliable technique that works across the many different types of devices to detect the end of a video session and then send the collected data from a device back to a video content provider. For example, the collected data may indicate that a viewer watched a video up to at least the beginning of the last segment (e.g., past the seventy-five percent point) of the video, but will not indicate how much of the last segment of the video the viewer watched if the video is stopped before playback is completed.

The heartbeat data collection approach is prone to this type of data loss, such as when a large amount of video playback data is collected over a long data collection interval, and then the data is not sent to the video content provider when a video session at the user device is suddenly ended. The heartbeat data collection approach also uses processing and bandwidth resources to accomplish the repeated server calls for a single video to communicate the collected data back to the video content provider. The periodic data collection intervals are also a user device configurable value, which leads to varying accuracy levels for collected data across different video content publisher sites, and this can result in analytics data that is unusable for any comparative study reports across publishers.

SUMMARY

This Summary introduces features and concepts of video playback analytics collection, which is further described below in the Detailed Description and/or shown in the Figures. This Summary should not be considered to describe essential features of the claimed subject matter, nor used to determine or limit the scope of the claimed subject matter.

Video playback analytics collection is described. In embodiments, an analytics script can be distributed to a client device along with video content that is requested by the client device. The analytics script is implemented to identify a type and/or version of a browser application that supports a video player session to playback the video content for viewing at the client device. The analytics script is also implemented to collect video playback data associated with the video content playback, detect an early end of the video player session before the playback of the video content is completed, and initiate communication of the video playback data to an analytics server. The analytics script can also initiate a timing delay to delay a browser navigation away from the video player session, where the timing delay is effective to allow reliable communication of the video playback data to the analytics server.

In embodiments, the analytics script can detect the early end of the video player session based on an event handler that indicates a browser navigation is pending to navigate away from the video player session, and initiate communication of the video playback data to the analytics server. The video playback data can be stored in memory and then communicated to the analytics server as one HTTP server call after the end of the video player session is detected. The analytics script is also implemented to determine a round-trip data communication latency from a client device to the analytics server, and initiate the timing delay for a time duration based on the round-trip data communication latency. In the event that a video player session is not ended at the client device, such as with a browser navigation input, the analytics script can initiate communication of the video playback data to the analytics server after a designated timeout duration.

In embodiments, the analytics script can initiate storing the video playback data in a cookie that is associated with the video player session at the computing device. If the video playback data is not communicated to the analytics server when the end of the video player session is detected, then the cookie and the video playback data can be maintained. The analytics script can then initiate communication of the video playback data that is stored in the cookie to the analytics server when a subsequent video player session is started. The cookie can then be deleted when the video playback data has been communicated to the analytics server.

BRIEF DESCRIPTION OF THE DRAWINGS

Embodiments of video playback analytics collection are described with reference to the following Figures. The same numbers may be used throughout to reference like features and components that are shown in the Figures.

DETAILED DESCRIPTION

Embodiments of video playback analytics collection are described and may be implemented in any type of device that supports video playback, such as a mobile phone, tablet, computing, communication, entertainment, gaming, media playback, and/or other type of device. An analytics script is distributed along with a video player from a content service at a publisher domain to a client device that requests video content. The content page that is served by the content service loads the video player, along with the analytics script, on the client device for a video player session. The analytics script is implemented to identify a brand, type, and/or version of a browser application that supports the video player session to playback the video content for viewing at the client device. The analytics script can be developed to include an individualized solution for each different browser application brand, type, and/or version.

The analytics script collects video playback data associated with the video content playback at the client device. The analytics script can also detect an end of the video player session at the client device and initiate the video playback data being communicated to an analytics server. The end of a video player session can be detected when the video content is played back for viewing through to an end of the video. Alternatively, the end of a video player session can be detected based on an event handler that indicates a browser navigation is pending to navigate away from the video player session. For example, a browser navigation may be initiated when a user input at the client device is received to close a browser user interface, select a browser tab to close the current Web page through which the video content is displayed, or initiate navigating away from playback the video content. A navigation input away from a video player session and the playback of the video content may also be detected as a user input to a home button of a client device (e.g., for devices that include a home button or similar feature).

The video playback data is communicated from the client device to the analytics server when the end of the video player session is detected. Unlike the heartbeat data collection approach described above, the video playback data can be stored in memory and/or in an HTTP cookie, and then communicated to the analytics server as one HTTP server call, which saves processing and bandwidth resources that would otherwise be used for the periodic interval server calls. This also eliminates the aspect of configurable interval values at both user devices and video content publisher sites, which leads to varying accuracy levels for the collected analytics data and the collected data being unusable for comparative study reports across the publishers, such as to determine audience ratings.

The analytics script is also implemented to initiate a timing delay to delay a pending browser navigation away from a video player session when an early end of the video player session is detected, such as before the playback of the video content is completed. This delays the browser application from ending the thread that executes the analytics script before the video playback data can be communicated from the client device to the analytics server. The timing delay can be initiated as a processor busy-wait that artificially occupies the processing at the client device to compute time so that the analytics script does not get shut down before sending the data. Accordingly, the timing delay is effective to allow communication of the video playback data to the analytics server before a video player session is ended.

While features and concepts of video playback analytics collection can be implemented in any number of different devices, systems, networks, environments, and/or configurations, embodiments of video playback analytics collection are described in the context of the following example devices, systems, and methods.

Figure 1:
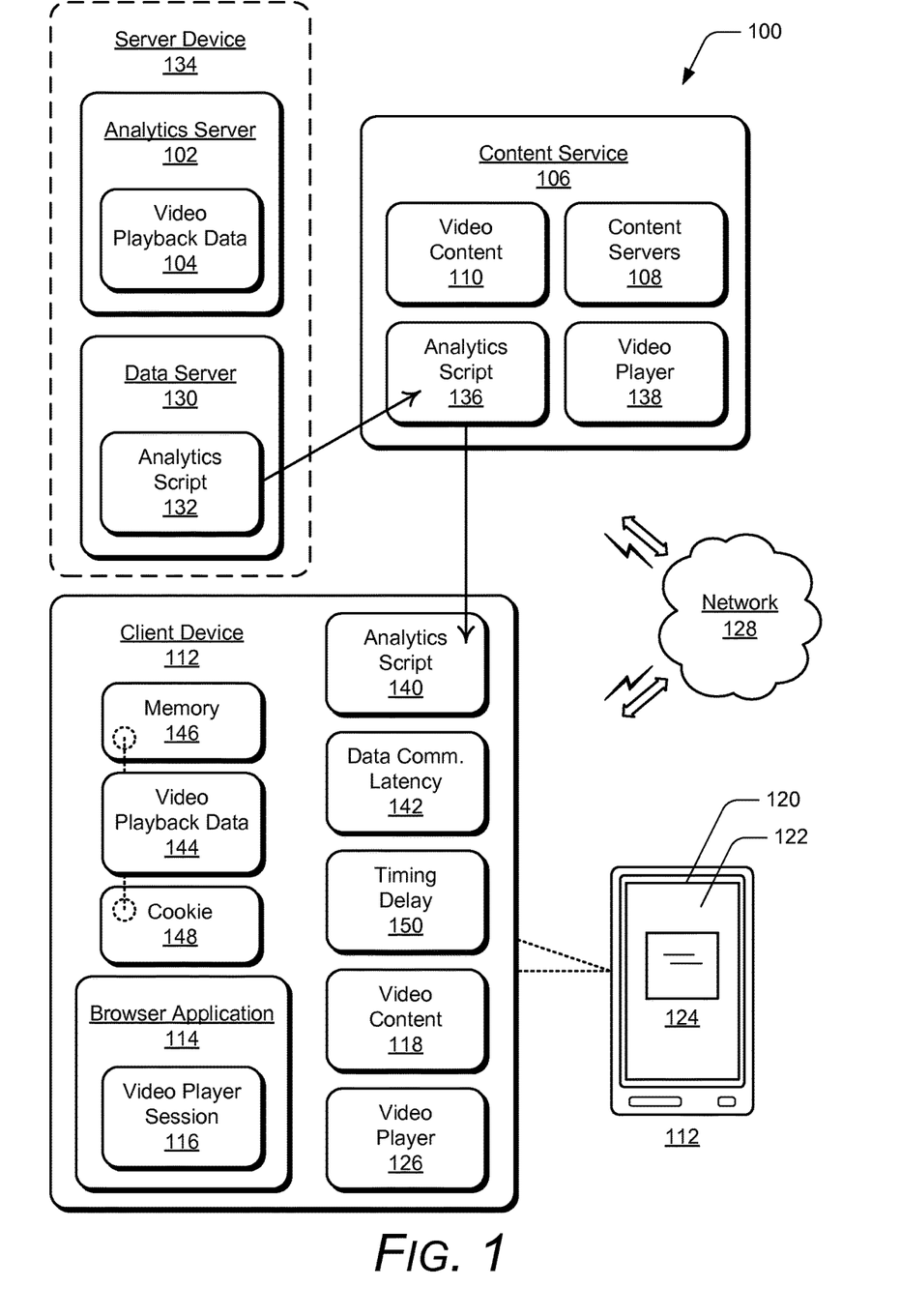
FIG. 1 illustrates an example system in which embodiments of video playback analytics collection can be implemented.

FIG. 1 illustrates an example system 100 in which embodiments of video playback analytics collection can be implemented. The system 100 includes an analytics server 102 (also referred to as a tracking server) that receives video playback data 104 associated with video content playback at various client devices. The system 100 also includes a content service 106 that implements content servers 108 to distribute video content 110 to client devices that request the video content for playback and viewing. The content service 106 is representative of any video content provider, such as a news or sports Web site, an advertiser or product manufacturer, a video sharing site, or any other Web site that includes downloadable video content.

The system 100 includes an example client device 112 in which embodiments of video playback analytics collection can be implemented. The example device may be any one or combination of a wired or wireless device, such as a mobile phone, tablet, computing, communication, entertainment, gaming, media playback, and/or other type of device. Any of the devices can be implemented with various components, such as a processing system and memory, as well as any number and combination of differing components as further described with reference to the example device shown in FIG. 5.

A user at the client device 112 can request the video content 110 from the content service 106, such as a video of a news story from a news site, or a video highlight from a sports site. The client device 112 includes a browser application 114 that supports a video player session 116 to playback video content 118 that is received from the content service for viewing at the client device. In this example, the client device includes an integrated display device 120 to display a user interface 122 (e.g., a user interface of the browser application) through which the video content 118 is displayed for viewing at 124. The client device 112 may also include a standalone video player 126 that supports the video player session 116 to playback the video content 118 for viewing.

Any of the devices and servers described herein can communicate via a network 128, which can be implemented to include a wired and/or a wireless network. The network can also be implemented using any type of network topology and/or communication protocol, and can be represented or otherwise implemented as a combination of two or more networks, to include IP-based networks and/or the Internet. The network may also include mobile operator networks that are managed by a mobile network operator and/or other network operators, such as a communication service provider, mobile phone provider, and/or Internet service provider.

In embodiments of video playback analytics collection, an analytics script is implemented to collect video playback data associated with video content playback at a client device. Various instances of the analytics script are shown in the example system 100. A data server 130 includes the analytics script 132, such as when the analytics script is developed for use. Although shown as independent servers, the data server 130 and the analytics server 102 may be implemented together as a single server. In practice, however, the analytics script 132 is distributed from the data server 130 via a content delivery network, and the analytics server 102 is implemented as a scalable, independent server that can be scaled to accommodate receiving the video playback data 104 from any number of multiple client devices. Alternatively or in addition, a server device 134 can include implementations of both the analytics server 102 and the data server 130, representative of a single entity that develops and distributes the analytics script, as well as collects the video playback data 104. A single entity may be the same server system, company system, domain, and the like.

The data server 130 can communicate the analytics script 132 to the content service 106 that maintains a version or instance of the analytics script 136. The content service can then distribute the analytics script 136 along with a video player 138 and/or the video content 110 to a client device that requests the video content 110. The content page that is served by the content service 106 (also referred to as a publisher domain) loads the video player, along with the analytics script, on the client device 112 for the video player session 116, such as flash video or HTML5 video embedded in the content page. In this example, the client device 112 receives a version or instance of the analytics script 140 along with the video content 118 that is requested from the content service.

The various instances of the analytics script 132, 136, and 140 can be maintained at the respective servers and/or devices as executable instructions that are stored on computer-readable storage media, such as any suitable memory device or electronic data storage. The analytics server 102, content service 106, and/or the client device 112 can each be implemented with computer-readable storage media as described with reference to the example device shown in FIG. 5. Accordingly, the data server 130 maintains the instance of the analytics script 132, the content service 106 maintains the instance of the analytics script 136, and the client device maintains the instance of the analytics script 140. Additionally, the analytics script 140 can be executed with a processing system at the client device 112 to implement embodiments of video playback analytics collection.

In embodiments, the analytics script 140 at the client device 112 is implemented to identify a brand, type, and/or version of the browser application 114 that supports the video player session 116 to playback the video content 118 for viewing at the client device 112 when the video player session is initiated. The analytics script can include different methods and can be utilized for any number of different types and versions of browser applications. For example, the analytics script can be developed to include an individualized solution for each different browser application brand, type, and/or version. The analytics script 140 is also implemented to initiate a server call to the analytics server 102 to determine an estimate of a round-trip data communication latency 142 from the client device 112 to the analytics server. This round-trip data communication latency is used as a function or basis as described in more detail below to delay the browser application 114 from ending the analytics script thread when the video player session 116 is ended, such as when a user initiates a browser navigation input that ends the video player session before playback of the video content has completed.

The analytics script 140 at the client device 112 is implemented to collect the video playback data 144 associated with video content playback at the client device, and initiate storing the video playback data in memory 146 (e.g., any type of computer-readable storage media) at the device. Alternatively or in addition, the video playback data can be stored in an HTTP cookie 148 of the browser application 114 and that is associated with the video player session 116 at the client device. The video playback data 144 can include any type of data and information related to the client device 112, the video content 118, the video player session 116, and playback of the video content for viewing. For example, the video playback data can include a session identifier, an identifier of the video content, a date and timestamp, the time when the video content is initiated for playback, a start time relative to the video content (e.g., zero seconds if playback is started at the beginning of the video, or started some number of seconds into the video), and/or an end time of the video content playback. The video playback data 144 can also include indications of user playback control inputs (also commonly referred to as trick modes), such as to pause, rewind, and fast-forward the video content during playback.

The analytics script 140 can detect an end of the video player session 116 at the client device 112 and initiate communication of the video playback data 144 to the analytics server 102, which receives the data as the video playback data 104. The video playback data 144 is communicated from the client device to the analytics server once when the end of the video player session is detected, and can be communicated as an HTTP server call to the analytics server. The analytics script 140 generates the HTTP server call, which contains the video playback data as server call parameters (e.g., query string parameters) of the server call.

Unlike the heartbeat data collection approach described above, the video playback data 144 can be communicated to the analytics server 102 as the one HTTP server call, which saves the processing and bandwidth resources that would otherwise be used for the periodic interval server calls. This also eliminates the aspect of configurable interval values at both the user devices and video content publisher sites, which leads to varying accuracy levels for the collected analytics data and the collected data being unusable for comparative study reports across the publishers, such as to determine audience ratings. Additionally, the one server call technique not only reduces the number of server calls, such as with the heartbeat data collection approach, but also can reduce the amount of analytics data that is collected and communicated to the analytics server 102 for analysis.

The analytics script 140 at the client device 112 can detect the end of the video player session 116 when the video content 118 is played back for viewing through to an end of the video. The analytics script 140 is also implemented to detect an early end of the video player session 116, such as before the playback of the video content is completed, based on an event handler that indicates a browser navigation is pending to navigate away from the video player session. For example, a browser navigation may be initiated when a user input at the client device 112 is received to close the browser user interface 122, select a browser tab to close the current Web page through which the video content is displayed, or initiate navigating away from playback of the video content. In implementations, the analytics script 140 can detect the end of the video player session 116 based on an on-before-unload event handler that is initiated in response to the browser application 114 shutting down the video player session.

Many desktop browser applications support the on-before-unload event handler, which is triggered just before a Web page is unloaded, such as when a user navigates to a different Web site, closes the tab for the current Web page, or closes the browser application 114. For devices with browser applications that do not support the on-before-unload event handler, the analytics script 140 at the client device 112 can detect the end of the video player session 116 as an on-unload event handler. For unsupported browser applications, a delayed data send can be implemented based on the data collected in the cookie 148 (or cookies) to communicate the video playback data for a previous video player session when a subsequent video player session is initiated.

Some newer version browser applications support a cross-domain XMLHttpRequest, which can be utilized to communicate the video playback data 144 from the client device 112 to the analytics server 102. However, the success of an XMLHttpRequest server call is not predictable, and the server call may not succeed in instances where the browser application 114 at the client device 112 ends the thread that is running the analytics script 140 before the asynchronous call is able to send the video playback data 144 to the analytics server. Additionally, each HTTP server call is preceded by multiple round-trip handshakes in the standard transmission control protocol (TCP) between the Web browser application 114 and the analytics server, which adds latency to the execution of the browser thread that is running the analytics script. A server call to the analytics server may succeed or fail based on whether or not the browser application 114 ends the thread that is executing the server call before a TCP connection to send the HTTP server call is established. Typically, a TCP connection is established before the HTTP server call is communicated to the analytics server with any of the techniques used to generate the HTTP server call.

In embodiments, the analytics script 140 at the client device 112 can initiate a timing delay 150 to delay a pending browser navigation away from the video player session 116 when an early end of the video player session is detected, such as before the playback of the video content is completed. This delays the browser application 114 from ending the thread that executes the analytics script 140 before the video playback data 144 can be communicated from the client device 112 to the analytics server 102. As noted above, a navigation response may be pending responsive to a user input at the client device 112 to close the browser user interface 122, select a browser tab to close the current Web page through which the video content is displayed, or initiate navigation away from the video content playback. A navigation input away from the video player session 116 and the playback of the video content 118 may also be detected as a user input to a home button of a client device (e.g., for devices that include a home button or similar feature).

The timing delay 150 can be initiated as a processor busy-wait that artificially occupies the processor to compute time so that the analytics script 140 at the client device 112 does not get shut down before sending the data. The timing delay 150 can be initiated and optimized for a time duration that is a function of, or based on, the round-trip data communication latency 142, and is effective to allow communication of the video playback data 144 to the analytics server 102. For example, although the scenario suggests that the timing delay can be a minimum one-half of the round-trip data communication latency, in practice, the timing delay may be set for twice the data communication latency, which may be three to four hundred milliseconds, or less. A maximum timing delay may also be established so as not to create a noticeably slow navigation response that results in a poor user experience. In implementations, an unneeded count variable may be stored so as to avoid having a compile optimization remove the timing delay.

As noted above, the analytics script 140 can initiate storing the video playback data 144 in the HTTP cookie 148 that is associated with the browser application 114 and the video player session 116. The HTTP cookie 148 and the video playback data is maintained in an event that the browser application 114 closes due to a processing error, a network connection is dropped, or if the client device 112 experiences a device crash, reset, or interrupt. For example, a user may be watching a video on a mobile phone when an incoming telephone call interrupts the video content playback. After the interruption, the video playback data 144 is still available and can be communicated to the analytics server 102.

Further, if the video playback data 144 is not communicated to the analytics server 102 when the end of the video player session 116 is detected, then the analytics script 140 can initiate communication of the video playback data that is stored in the HTTP cookie 148 to the analytics server when a subsequent video player session is started. For example, a user of the client device 112 may revisit the same Web site to watch the same video, or to request another video for viewing. The analytics script 140 can then detect that the HTTP cookie from the previous video player session has been maintained, and initiate communication of the video playback data that is stored in the HTTP cookie to the analytics server when the subsequent video player session is started. The analytics script 140 can also delete the HTTP cookie 148 when the video playback data 144 has been communicated to the analytics server 102.

The analytics script 140 at the client device 112 is also implemented to initiate communication of the video playback data 144 to the analytics server 102 after a designated timeout duration in an event that the video player session 116 is not ended within the designated timeout duration. For example, a user may be watching a video on a device and, rather than ending the video player session 116, may simply pause the video content playback and then not use the device, or walk away from the device. After the designated timeout duration, such as one hour for example, the analytics script 140 can initiate communication of the video playback data 144 to the analytics server 102, or at the next available opportunity when the device is powered-on or awakened for use.

The analytics server 102 can process the video playback data 104 that is received from the client device 112 to implement embodiments of video playback analytics collection. For example, the analytics server can determine from the timing data included in the video playback data 104 whether the video playback data 144 was communicated from the client device 112 after the video content is played back for viewing through to an end of the video content. The analytics server can also determine whether the video player session 116 at the client device was ended early before playback of the video content was completed, such as when a browser navigation is initiated to navigate away from the video player session. Alternatively, the analytics server can determine whether the video playback data is received from the client device after a designated timeout duration in an event that the video player session was not ended at the client device. The analytics script can also determine whether the video playback data is received from the client device as data stored in the cookie 148 after an interrupt of the video player session and when a subsequent video player session is started at the client device.

In implementations, the analytics server 102 can designate the timeout duration for the video content 118 that is displayed for viewing at the client device 112, such as based on the length of the video. The timeout duration can also be designated based on whether the video is displayed for viewing on a mobile device, which may be a shorter timeout duration, or displayed for viewing on a desktop device, which may be a longer timeout duration. The analytics server 102 can also identify that the video playback data 104 is received as one server call from the client device 112, and that multiple events are recorded in the one server call.

The analytics server 102 can also determine not only what segments and how much of a video has been played back for viewing, but also determine a timeline of how the video was viewed. The timeline can indicate the segments of the video that were played back for viewing, such as based on the playback start and/or stop times relative to the video content, as well as based on any user playback control inputs, such as to pause, rewind, and fast-forward the video content during playback. Alternatively or in addition, the analytics script 140 at the client device 112 can determine the timeline of the video segments that are played back for viewing, and then communicate the segment viewed information to the analytics server as part of the video playback data 144.

Example methods 200, 300, and 400 are described with reference to respective FIGS. 2-4 in accordance with one or more embodiments of video playback analytics collection. Generally, any of the services, components, modules, methods, and operations described herein can be implemented using software, firmware, hardware (e.g., fixed logic circuitry), manual processing, or any combination thereof. The example methods may be described in the general context of executable instructions stored on computer-readable storage media that is local and/or remote to a computer processing system, and implementations can include software applications, programs, functions, and the like.

Figure 2:
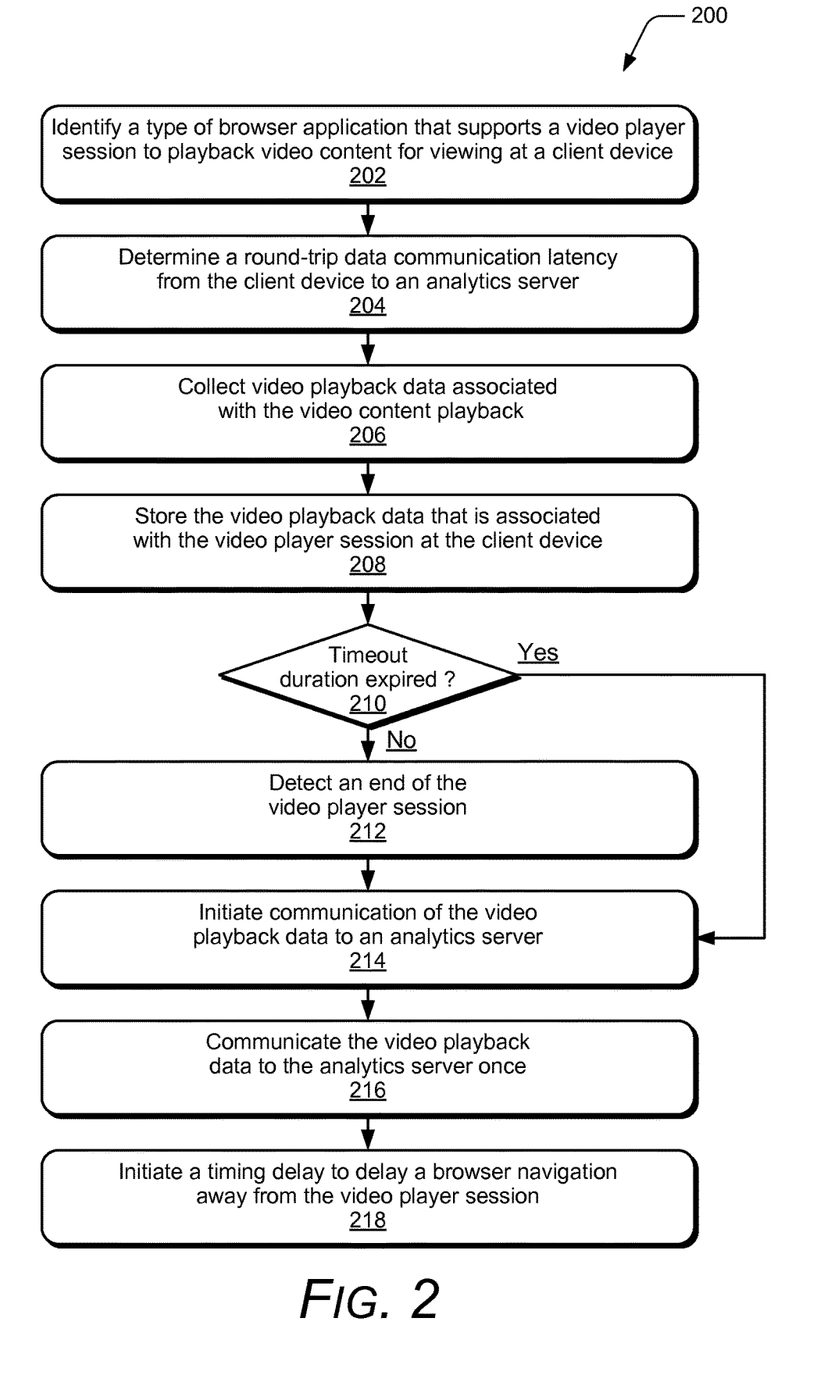
FIG. 2 illustrates example method(s) of video playback analytics collection in accordance with one or more embodiments.

FIG. 2 illustrates example method(s) 200 of video playback analytics collection, and is generally described with reference to an analytics script. The order in which the method is described is not intended to be construed as a limitation, and any number or combination of the method operations can be combined in any order to implement a method, or an alternate method.

At 202, a type of browser application is identified that supports a video player session to playback video content for viewing at a client device. For example, the analytics script 140 at the client device 112 (FIG. 1) identifies the brand, type, and/or version of the browser application 114 that supports the video player session 116 to playback the video content 118 for viewing at the client device. The analytics script can include an individualized solution for each different browser application brand, type, and/or version.

At 204, a round-trip data communication latency from the client device to an analytics server is determined. For example, the analytics script 140 at the client device 112 initiates a server call to the analytics server 102 to determine the round-trip data communication latency 142 from the client device 112 to the analytics server. This round-trip data communication latency is used as a function or basis to delay the browser application 114 from ending the thread that executes the analytics script 140 when the video player session 116 is ended early, such as before the playback of the video content 118 is completed.

At 206, video playback data associated with the video content playback is collected. For example, the analytics script 140 at the client device 112 collects the video playback data 144 that is associated with playback of the video content 118 for viewing at the client device. The video playback data that is collected can include any type of data and information related to the client device 112, the video content 118, the video player session 116, and playback of the video content for viewing. For example, the video playback data can include a session identifier, an identifier of the video content, a date and timestamp, the time when the video content is initiated for playback, a start time relative to the video content (e.g., zero seconds if playback is started at the beginning of the video, or started some number of seconds into the video), and/or an end time of the video content playback. The video playback data can also include indications of user playback control inputs, such as to pause, rewind, and fast-forward the video content during playback.

At 208, the video playback data that is associated with the video player session is stored at the client device. For example, the analytics script 140 at the client device 112 stores the video playback data 144 in memory 146 at the client device. Alternatively or in addition, the video playback data can be stored in the HTTP cookie 148 that is associated with the video player session 116 at the client device 112.

At 210, a determination is made as to whether a designated timeout duration has expired. For example, the analytics script 140 at the client device 112 determines whether a designated timeout duration has expired, such as in an event that the video player session 116 has not ended within the designated timeout duration. This can occur when a user may be watching a video on the client device 112 and, rather than ending the video player session 116, may simply pause the video content playback and then not use the device, or walk away from the device.

If the designated timeout duration has not expired (i.e., "no" from 210), then at 212, an end of the video player session is detected. For example, the analytics script 140 at the client device 112 detects the end of the video player session 116 when the video content 118 is played back for viewing through to an end of the video. The analytics script 140 can also detect an early end of the video player session 116, such as before the playback of the video content is completed, based on an event handler that indicates a browser navigation is pending to navigate away from the video player session. A browser navigation may be initiated when a user input at the client device 112 is received to close the browser user interface 122, select a browser tab to close the current Web page through which the video content is displayed, or initiate navigating away from the video content playback. For some types of browser applications, the analytics script 140 can detect the end of the video player session based on an on-before-unload event handler that is initiated in response to the browser application 114 shutting down the video player session 116. For other browser application types, the analytics script 140 can detect the end of the video player session 116 as an on-unload event handler.

If the designated timeout duration has expired, (i.e., "yes" from 210), or continuing from detecting the end of the video player session at 212, communication of the video playback data is initiated to an analytics server at 214. For example, the analytics script 140 at the client device 112 initiates communication of the video playback data 144 from the client device to the analytics server 102, such as when the designated timeout duration expires (at 210), or when the end of the video player session 116 is detected (at 212). The analytics script 140 initiates communication of the video playback data 144 to the analytics server 102 after the designated timeout duration in an event that the video player session 116 is not ended within the designated timeout duration.

At 216, the video playback data is communicated to the analytics server once. For example, the client device 112 communicates the video playback data 144 to the analytics server 102 when initiated by the analytics script 140 (at 214). The video playback data 144 can be communicated to the analytics server 102 as one HTTP server call, which contains the video playback data as server call parameters (e.g., query string parameters) of the server call. The one HTTP server call saves processing and bandwidth resources to communicate the video playback data to the analytics server.

If an early end of the video player session is detected (at 212), then at 218, a timing delay is initiated to delay a browser navigation away from the video player session. For example, the analytics script 140 at the client device 112 initiates the timing delay 150 to delay a pending browser navigation away from the video player session 116, which delays the browser application 114 from ending the thread that executes the analytics script 140 and is effective to allow reliable communication of the video playback data to the analytics server 102. The timing delay 150 can be initiated as a processor busy-wait that artificially occupies the processor to compute time so that the analytics script 140 does not get shut down before sending the data. The timing delay 150 can also be optimized for a time duration that is a function of, or based on, the round-trip data communication latency 142.

Figure 3:
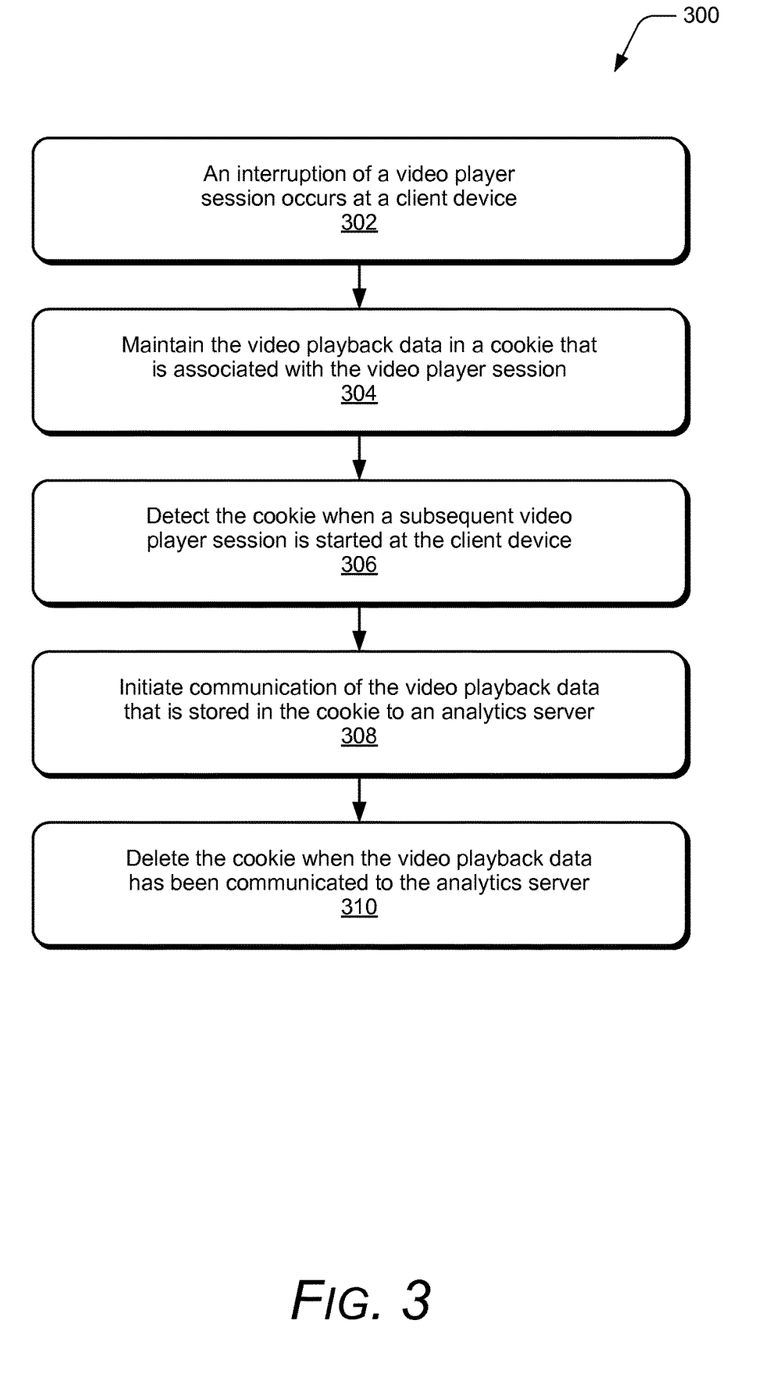
FIG. 3 illustrates example method(s) of video playback analytics collection in accordance with one or more embodiments.

FIG. 3 illustrates example method(s) 300 of video playback analytics collection, and is generally described with reference to an analytics script. The order in which the method is described is not intended to be construed as a limitation, and any number or combination of the method operations can be combined in any order to implement a method, or an alternate method.

At 302, an interruption of a video player session occurs at a client device. For example, an interruption of the video player session 116 occurs at the client device 112 (FIG. 1). An interruption of the video player session can occur when the browser application 114 that supports the video player session closes due to a processing error, a network connection is dropped, or if the client device 112 experiences a device crash, reset, or interrupt.

At 304, the video playback data is maintained in a cookie that is associated with the video player session at the client device. As described with reference to FIG. 2 (at 206 and 208), the analytics script 140 at the client device 112 collects and stores the video playback data 144 in memory 146 at the client device and/or stores the video playback data in the HTTP cookie 148 that is associated with the video player session 116 at the client device. The HTTP cookie 148 and the video playback data 144 is maintained at the client device, such as when an interruption of the video player session occurs (at 302) and/or for a Browser application that does not support event handlers.

At 306, the cookie is detected when a subsequent video player session is started at the client device. For example, the analytics script 140 at the client device 112 detects the HTTP cookie 148 that stores the video playback data 144 when a subsequent video player session is started at the client device, such as when a user of the client device 112 revisits the same Web site to watch the same video, or to request another video for viewing.

At 308, communication of the video playback data that is stored in the cookie is initiated to an analytics server. For example, the analytics script 140 at the client device 112 initiates communication of the video playback data 144 that is stored in the HTTP cookie 148 to the analytics server 102 when the subsequent video player session is started and the HTTP cookie is detected (at 306). The client device 112 then communicates the video playback data to the analytics server when initiated by the analytics script.

At 310, the cookie is deleted when the video playback data has been communicated to the analytics server. For example, the analytics script 140 at the client device 112 deletes the HTTP cookie 148 when the video playback data 144 has been communicated to the analytics server 102.

Figure 4:
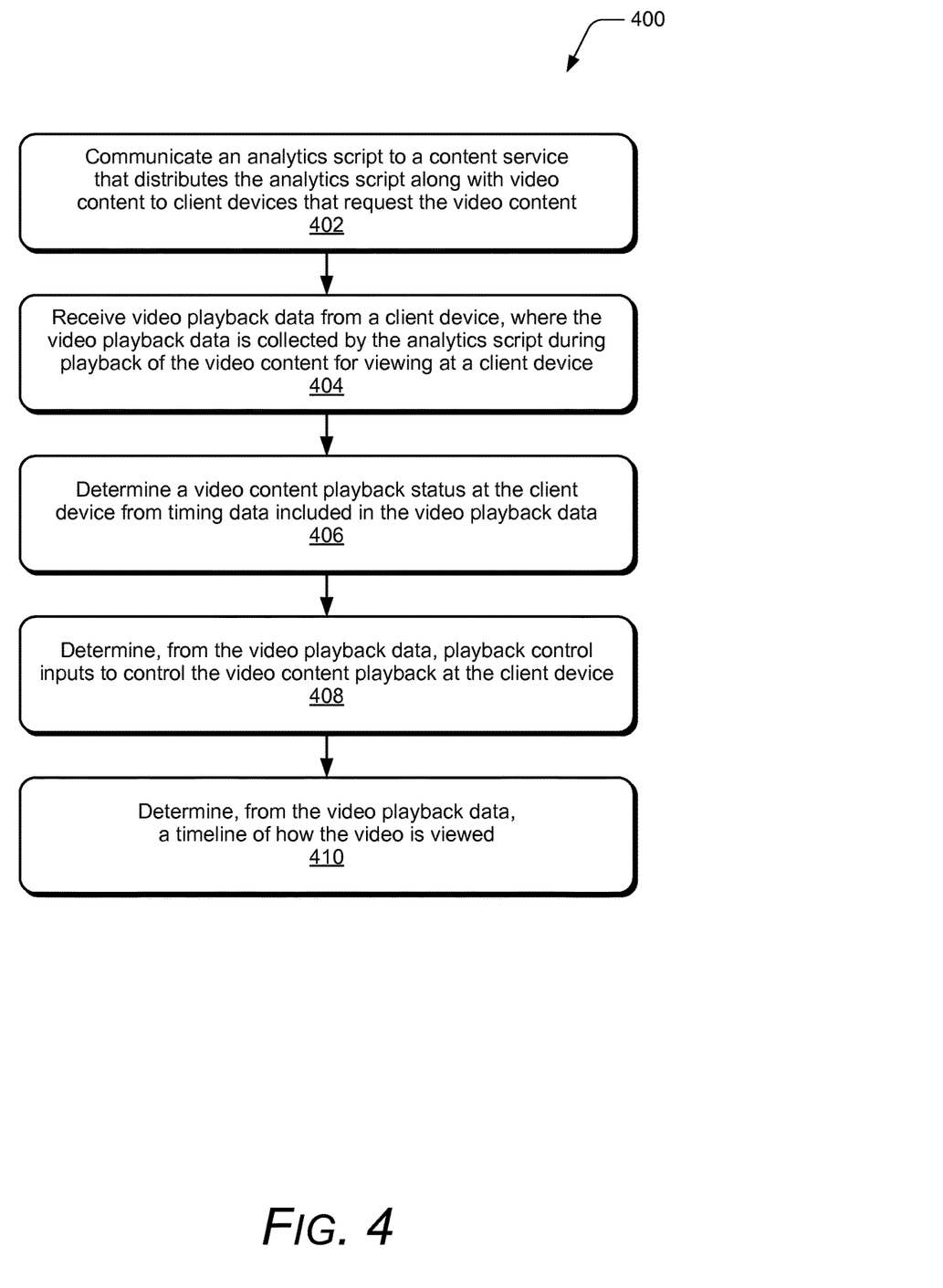
FIG. 4 illustrates example method(s) of video playback analytics collection in accordance with one or more embodiments.

FIG. 4 illustrates example method(s) 400 of video playback analytics collection, and is generally described with reference to an analytics server. The order in which the method is described is not intended to be construed as a limitation, and any number or combination of the method operations can be combined in any order to implement a method, or an alternate method.

At 402, an analytics script is communicated to a content service that distributes the analytics script along with video content to client devices that request the video content. For example, the data server 130 (FIG. 1) includes the version of the analytics script 132, such as when the analytics script is developed for use, and the data server communicates the analytics script 132 to the content service 106 where the script is maintained as the version of the analytics script 136. The content service can then distribute the analytics script 136 along with a video player 138 and/or the video content 110 to a client device that requests the video content. The data server 130 and the analytics server 102 may be implemented as part of the same server system, company system, domain, and the like.

At 404, video playback data is received from a client device, where the video playback data is collected by the analytics script during playback of the video content for viewing at a client device. For example, the analytics server 102 receives the video playback data 144 from the client device 112, where the video playback data is collected by the analytics script 140 during playback of the video content 118 for viewing at the client device. The video content 118 is played back at the client device through the browser application 114 that supports the video player session 116. The analytics script 140 at the client device 112 detects an end of the video player session and initiates communication of the video playback data 144 from the client device to the analytics server. The analytics server 102 receives the video playback data as an HTTP server call from the client device.

At 406, a video content playback status at the client device is determined from timing data included in the video playback data. For example, the analytics server 102 determines that the video content 118 was played back for viewing at the client device 112 through to an end of the video content. The analytics server can also determine that the video player session 116 at the client device was ended early before playback of the video content was completed and the video playback data 144 was received from the client device 112 responsive to a browser navigation away from the video player session. The analytics server can also determine that the video playback data 144 was received from the client device 112 after a designated timeout duration in an event that the video player session was not ended at the client device, or the video playback data 144 was received as data stored in the HTTP cookie 148 after an interrupt of the video player session and when a subsequent video player session is started at the client device.

At 408, playback control inputs to control the video content playback at the client device are determined from the video playback data. For example, the analytics server 102 determines user playback control inputs, such as to pause, rewind, and fast-forward the video content during playback from the video playback data 104, which is received as the video playback data 144 from the client device 112.

At 410, a timeline of how the video is viewed is determined from the video playback data. For example, the analytics server 102 determines not only what segments and how much of a video has been played back for viewing, but also determines a timeline of how the video was viewed. The timeline can indicate the segments of the video that were played back for viewing, such as based on the playback start and/or stop times relative to the video content, as well as based on any user playback control inputs (e.g., determined at 408).

Figure 5:
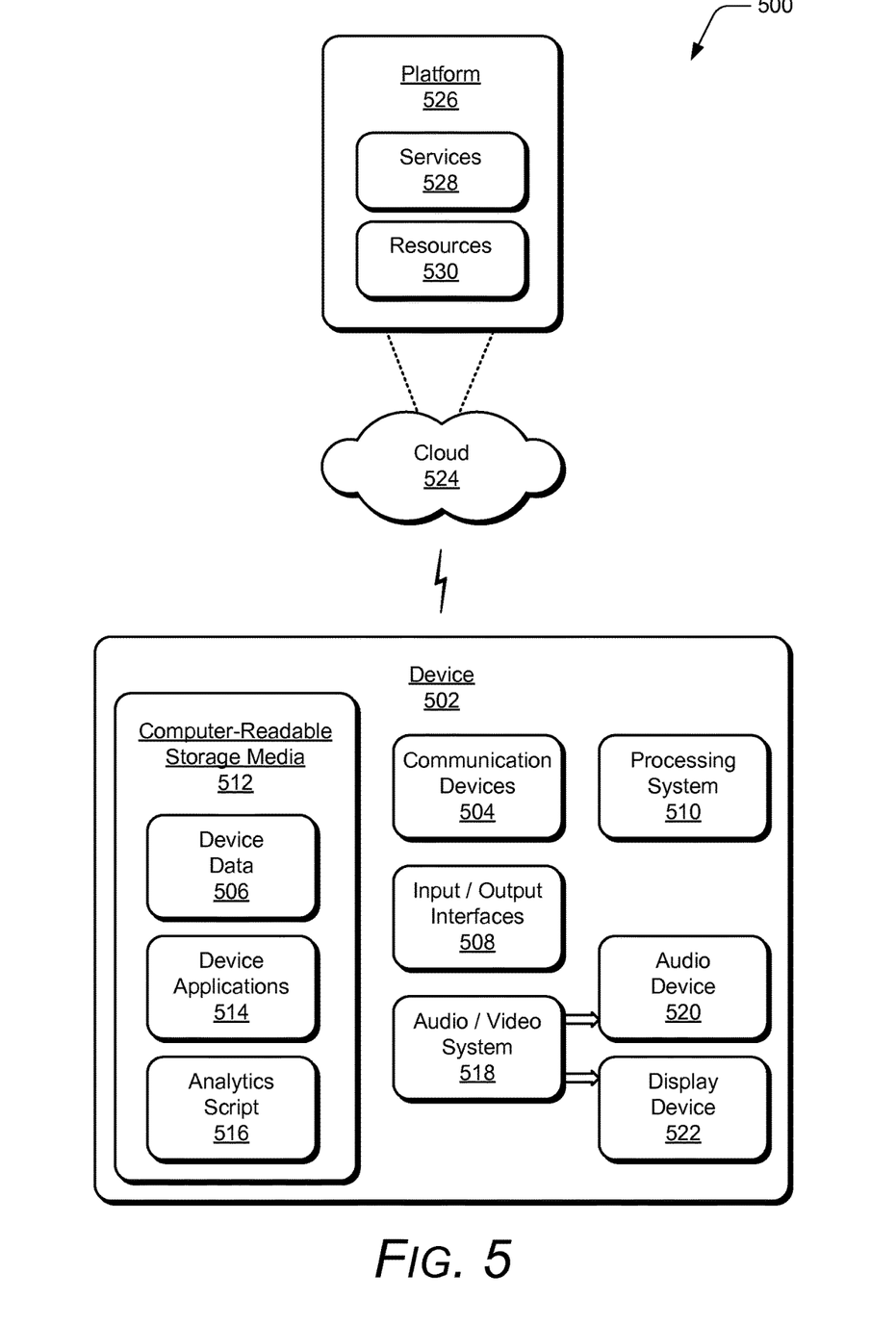
FIG. 5 illustrates an example system with an example device that can implement embodiments of video playback analytics collection.

FIG. 5 illustrates an example system 500 that includes an example device 502, which can implement embodiments of video playback analytics collection. The example device 502 can be implemented as any of the devices and/or servers described with reference to the previous FIGS. 1-4, such as any type of client device, mobile phone, tablet, computing, communication, entertainment, gaming, media playback, and/or other type of device. For example, the analytics server 102, content service 106, and/or the client device 112 shown in FIG. 1 may be implemented as the example device 502.

The device 502 includes communication devices 504 that enable wired and/or wireless communication of device data 506, such as media content and the video playback data that is collected and stored on the device. The media content can include any type of audio, video, and/or image data. The communication devices 504 can also include transceivers for cellular phone communication and for network data communication.

The device 502 also includes input/output (I/O) interfaces 508, such as data network interfaces that provide connection and/or communication links between the device, data networks, and other devices. The I/O interfaces can be used to couple the device to any type of components, peripherals, and/or accessory devices. The I/O interfaces also include data input ports via which any type of data, media content, and/or inputs can be received, such as user inputs to the device, as well as any type of audio, video, and/or image data received from any content and/or data source.

The device 502 includes a processing system 510 that may be implemented at least partially in hardware, such as with any type of microprocessors, controllers, and the like that process executable instructions. The processing system can include components of an integrated circuit, programmable logic device, a logic device formed using one or more semiconductors, and other implementations in silicon and/or hardware, such as a processor and memory system implemented as a system-on-chip (SoC). Alternatively or in addition, the device can be implemented with any one or combination of software, hardware, firmware, or fixed logic circuitry that may be implemented with processing and control circuits. The device 502 may further include any type of a system bus or other data and command transfer system that couples the various components within the device. A system bus can include any one or combination of different bus structures and architectures, as well as control and data lines.

The device 502 also includes computer-readable storage media 512, such as data storage devices that can be accessed by a computing device, and that provide persistent storage of data and executable instructions (e.g., software applications, programs, functions, and the like). Examples of computer-readable storage media include volatile memory and non-volatile memory, fixed and removable media devices, and any suitable memory device or electronic data storage that maintains data for computing device access. The computer-readable storage media can include various implementations of random access memory (RAM), read-only memory (ROM), flash memory, and other types of storage media in various memory device configurations.

The computer-readable storage media 512 provides storage of the device data 506 and various device applications 514, such as an operating system that is maintained as a software application with the computer-readable storage media and executed by the processing system 510. In this example, the device applications also include an analytics script 516 that implements embodiments of video playback analytics collection, such as when the example device 502 is implemented as the client device 112 shown in FIG. 1. An example of the analytics script 516 is the analytics script 140 at the client device 112, as described with reference to FIGS. 1-4.

The device 502 also includes an audio and/or video system 518 that generates audio data for an audio device 520 and/or generates display data for a display device 522. The audio device and/or the display device include any devices that process, display, and/or otherwise render audio, video, display, and/or image data. In implementations, the audio device and/or the display device are integrated components of the example device 502. Alternatively, the audio device and/or the display device are external, peripheral components to the example device.

In embodiments, at least part of the techniques described for video playback analytics collection may be implemented in a distributed system, such as over a "cloud" 524 in a platform 526. The cloud 524 includes and/or is representative of the platform 526 for services 528 and/or resources 530. For example, the services 528 may include any of the analytics server 102, the data server 130, and the content service 106 described with reference to FIG. 1. Additionally, the resources 530 may include the version of the analytics script 132 as developed at the data server 130, the version of the analytics script 136 as maintained at the content service 106, and/or the video content 110 as described with reference to FIG. 1.

The platform 526 abstracts underlying functionality of hardware, such as server devices (e.g., included in the services 528) and/or software resources (e.g., included as the resources 530), and connects the example device 502 with other devices, servers, etc. The resources 530 may also include applications and/or data that can be utilized while computer processing is executed on servers that are remote from the example device 502. Additionally, the services 528 and/or the resources 530 may facilitate subscriber network services, such as over the Internet, a cellular network, or Wi-Fi network. The platform 526 may also serve to abstract and scale resources to service a demand for the resources 530 that are implemented via the platform, such as in an interconnected device embodiment with functionality distributed throughout the system 500. For example, the functionality may be implemented in part at the example device 502 as well as via the platform 526 that abstracts the functionality of the cloud 524.

Although embodiments of video playback analytics collection have been described in language specific to features and/or methods, the appended claims are not necessarily limited to the specific features or methods described. Rather, the specific features and methods are disclosed as example implementations of video playback analytics collection.

The invention claimed is:

1. Non-transitory computer-readable storage memory comprising an analytics script stored as instructions that are executable and, responsive to execution of the instructions at a computing device, the computing device performs operations of the analytics script comprising to:
   identify a type of a browser application that supports a video player session to playback video content for viewing at the computing device, the analytics script distributed to the computing device with the video content and includes an individualized solution for each type of browser application;
   collect video playback data associated with the video content playback;
   determine a round-trip data communication latency from the computing device to an analytics server;
   detect, by the analytics script at the computing device, an early end of the video player session before the playback of the video content is completed;
   initiate a timing delay for a time duration based on the round-trip data communication latency, when the early end of the video player session is detected, to delay the browser application from ending the execution of the analytics script responsive to a browser navigation away from the video player session; and
   initiate communication of the video playback data to the analytics server, the timing delay effective to allow communication of the video playback data to the analytics server before the video player session has ended.

2. Non-transitory computer-readable storage memory as recited in claim 1, wherein the computing device performs the operations of the analytics script further comprising to initiate the communication of the video playback data as an HTTP server call to the analytics server, the HTTP server call including the video playback data as query string parameters of the HTTP server call.

3. Non-transitory computer-readable storage memory as recited in claim 1, wherein the computing device performs the operations of the analytics script further comprising to communicate the video playback data to the analytics server once when the early end of the video player session is detected.

4. Non-transitory computer-readable storage memory as recited in claim 1, wherein the computing device performs the operations of the analytics script further comprising to detect the early end of the video player session based on an event handler that indicates the browser navigation is pending to navigate away from the video player session.

5. Non-transitory computer-readable storage memory as recited in claim 1, wherein the computing device performs the operations of the analytics script further comprising to:
   store the video playback data in a cookie that is associated with the video player session at the computing device;
   initiate the communication of the video playback data that is stored in the cookie to the analytics server when a subsequent video player session is started; and
   delete the cookie when the video playback data has been communicated to the analytics server.

6. Non-transitory computer-readable storage memory as recited in claim 1, wherein the computing device performs the operations of the analytics script further comprising to initiate the communication of the video playback data to the analytics server after a designated timeout duration in an event that the video player session is not ended within the designated timeout duration.

7. Computer-readable storage memory as recited in claim 1, wherein the video playback data includes a session identifier, an identifier of the video content, a date and timestamp, a time when the video content is initiated for playback, a start time relative to the video content, and an end time of the video content playback.

8. A method, comprising:
   communicating an analytics script to a content service that distributes the analytics script along with video content to a client device that requests the video content, the analytics script implementing:
   identifying a type of a browser application that supports a video player session to playback the video content for viewing at the client device;
   collecting video playback data associated with the video content playback at the client device;
   determining a round-trip data communication latency from the client device to the content service;
   detecting an early end of the video player session at the client device before the playback of the video content is completed at the client device;
   initiating a timing delay for a time duration based on the round-trip data communication latency, when the early end of the video player session is detected, to delay a browser navigation away from the video player session, the timing delay effective to allow communication of the video playback data from the client device;
   receiving the video playback data from the client device; and
   determining, from timing data included in the video playback data, whether the video playback data is received from the client device as data stored in a cookie after the early end of the video player session is detected.

9. A method as recited in claim 8, further comprising:
   determining, from the video playback data, playback control inputs to control the video content playback at the client device; and
   determining, from the timing data included in the video playback data, whether at least one of:
   the video content was played back for viewing at the client device through to an end of the video content; and
   the video playback data is received from the client device after a designated timeout duration in an event that the video player session was not ended at the client device.

10. A method as recited in claim 8, wherein said receiving the video playback data from the client device includes receiving the video playback data during the timing delay that is initiated when the analytics script detects the early end of the video player session.

11. A method as recited in claim 8, wherein the video playback data collected by the analytics scripts includes data related to one or more of the client device, the video content, the video player session, and playback of the video content for viewing.

12. A method as recited in claim 8, wherein the video playback data includes a session identifier, an identifier of the video content, a date and timestamp, a time when the video content is initiated for playback, a start time relative to the video content, and an end time of the video content playback.

13. A server system, comprising:
   a data server configured to communicate an analytics script to a content service that distributes the analytics script along with video content to client devices that request the video content, the analytics script configured to:
   identify a type of a browser application that supports a video player session to playback the video content for viewing at the client device, the analytics script including an individualized solution for each type of browser application;

collect video playback data associated with the video content playback at the client device;

initiate communication of the video playback data when an early end of the video player session is detected by the analytics script at the client device before the playback of the video content is completed at the client device;

determine a round-trip data communication latency from the client device to an analytics server;

initiate a timing delay for a time duration based on the round-trip data communication latency, when the early end of the video player session is detected, to delay a browser navigation away from the video player session, the timing delay effective to allow communication of the video playback data from the client device; and the analytics server configured to receive the video playback data during the timing delay that is initiated by the analytics script at the client device.

14. A server system as recited in claim 13, wherein the data server and the analytics server are implemented together by a server device.

15. A server system as recited in claim 13, wherein the analytics script is configured to initiate the communication of the video playback data as an HTTP server call to the analytics server, the HTTP server call including the video playback data as query string parameters of the HTTP server call.

16. A server system as recited in claim 13, wherein the video playback data is communicated once to the analytics server when the early end of the video player session is detected.

17. A server system as recited in claim 13, wherein the analytics script is configured to detect the early end of the video player session based on an event handler that indicates the browser navigation is pending to navigate away from the video player session.

18. A server system as recited in claim 13, wherein the video playback data includes a session identifier, an identifier of the video content, a date and timestamp, a time when the video content is initiated for playback, a start time relative to the video content, and an end time of the video content playback.

19. A server system as recited in claim 13, wherein the analytics script is configured to:
    store the video playback data in a cookie that is associated with the video player session at the client device;
    initiate the communication of the video playback data to the analytics server when a subsequent video player session is started; and
    delete the cookie when the video playback data has been communicated to the analytics server.

20. A server system as recited in claim 13, wherein the analytics script is configured to initiate the communication of the video playback data after a designated timeout duration in an event that the video player session is not ended within the designated timeout duration.

* * * * *